Feb. 5, 1935.  D. E. CUMMINS  1,989,685
AUDIBLE SPEED INDICATING APPARATUS
Filed Sept. 3, 1931
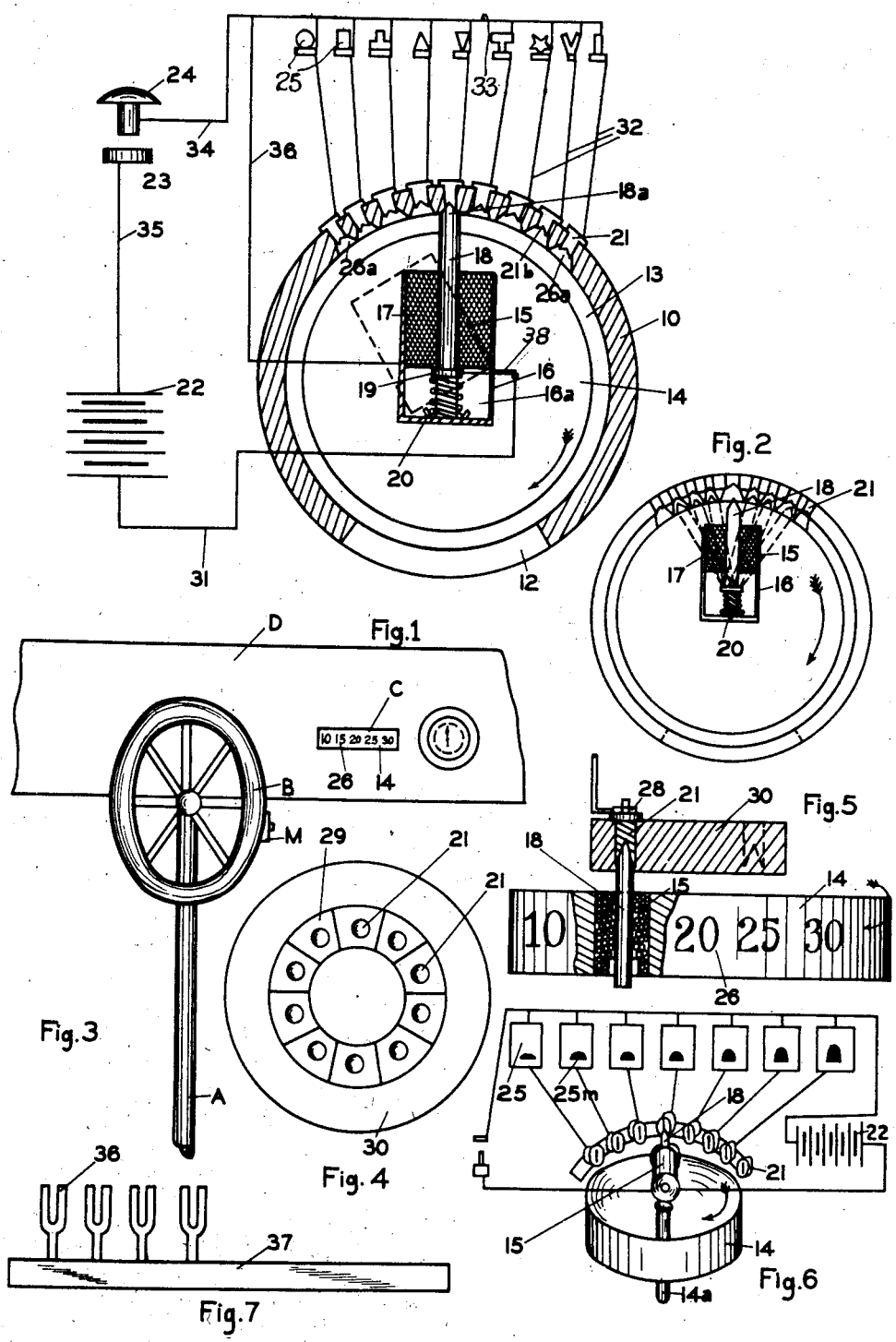
INVENTOR:
David E. Cummins

UNITED STATES PATENT OFFICE 1,989,685

AUDIBLE SPEED INDICATING APPARATUS

David E. Cummins, United States Navy

Application September 3, 1931, Serial No. 560,998

9 Claims. (Cl. 177—311.5)

(Granted under the act of March 3, 1883, as amended April 30, 1928; 370 O. G. 757)

This invention relates to a speed indicating device, and more particularly to one that may be made to emit a characteristic sound for each speed that may be predetermined and provided for in the construction of the instrument.

It is the object of this invention to provide a speedometer which will, when properly actuated, give forth an audible signal which will apprise the operator of the speed of his vehicle without the necessity of diverting his attention from the road to look at the visual indicator.

In the drawing:

Fig. 1 is a schematic lay-out of the several parts of the invention;

Fig. 2 is a detail figure indicating various positions of the movable contact member;

Fig. 3 shows one contemplated position for mounting the actuating switch of my invention;

Figs. 4 and 5 relate to a modified form of fixed contact assembly;

Fig. 6 shows another type of fixed contact member;

Fig. 7 represents a different kind of speed responsive audible signal.

With the present density of vehicular traffic, and the high speeds at which that traffic moves, it may be dangerous for the driver of an automotive conveyance to divert his attention from the road to ascertain his speed. I have therefore made this invention to give audible indication of the speed of a vehicle, in which I utilize the known constructions of speedometers.

Another method of giving audible indication of speed may be provided by mounting a phonographic mechanism with suitable electrical connections, so that the speed indication on the speedometer will be spoken which may be used in connection with amplifying tubes, etc., to obtain louder sounds if necessary.

It is to be understood that the disclosure herein is by way of illustration only, and not of limitation, and the breadth of my invention is to be defined by the scope of the appended claims.

An annular frame 10 is disposed around the dial 14 of the speedometer and is separated therefrom by the space 13. The calibrations 26 on the dial are visible through an opening C on the dash D of the car.

Mounted on the dial 10 to rotate therewith is a solenoid 15 in an insulating casing 16, with a free space 16a between the solenoid and the end of the case. A magnetic core 18 is slidably mounted in solenoid 15, and has a flange 19 thereon. Contractile spring 20 is mounted on the inner end of core 18 with one end attached to flange 19 and the other end fixed to the case 16, so that the spring normally holds the plunger with its magnetic center inwardly of the longitudinal center of the solenoid, whereby the plunger will be propelled outwardly when the solenoid is energized by the passage of an electric current therethrough. The electromagnetic means just described enables the operator to actuate with facility the audible speed indicating mechanism at any time.

A plurality of fixed contact elements 21 are mounted in frame 10. Each of these elements has a notch in its inner end to receive the outer end of core 18 which has a configuration complementary to the notches. Each element 21 is connected by a wire 32 to a sound device 25 that gives a characteristic note when actuated. The diversely shaped figures representing the devices 25 are symbolic of the different sounds emitted by them. Wire 33 is common to all the devices 25 and is connected to switch push-button 24 by wire 34. The fixed contact 23, which coacts with button 24 to close the circuit, is connected to the battery 22 by wire 35.

Solenoid 15 is connected to the switch and battery circuit by wires 31 and 36, the former being connected to core 18 also by wire 38. It will be seen that when switch button 24 is pressed against contact 23 that current will flow through the solenoid 15; the magnetic field thus set up will tend to draw core 18 so that the magnetic center of the core is at the longitudinal center of the solenoid, and core 18 will be projected into position to engage one of the contacts 21, which will permit current to flow through the core and one of the sound devices 25 and the note or sound characteristic of the speed at which the vehicle is then travelling will be emitted. The switch elements 23 and 24 may be mounted on the steering wheel B as indicated at M. It will probably be preferable to space the contacts 21 to correspond to the calibrations indicating speeds of five miles per hour and the multiples thereof, though different arrangements thereof may be made as desired.

In the modification shown in Figs. 4 and 5 the member 30 in which are the contact elements 21 is mounted above the dial 14, and the solenoid 15 and its core 18 are disposed so that the core will move vertically to engage with the contact members. The binding post 28 secures the wire that connects the contact 21 with its sounding device 25.

In Fig. 6 the contacts 21 are of the two-blade separable type instead of being solid with a V- shaped groove to receive the end of core 18. The different shapes of the apertures 25m indicate that the sound emitted by each device 25 is characteristic and peculiar to itself, so that it will indicate a single definite speed.

Fig. 7 shows still another embodiment of my invention wherein is utilized the fact that a tuning fork will be set in operation by a vibration that has the same frequency as the natural period of the fork. The forks 36 are mounted on a base 37 that is secured to the engine block. Each speed of the engine sets up a vibration that is characteristic of that speed, so that at different speeds of an engine equipped with the embodiment of my invention shown in Fig. 7 the several forks 36 will each respond to the vibration of its own frequency and the driver can tell by the note that is being emitted by a fork what the speed of his vehicle is. These sounds will be low but distinct and can be heard by listening attentively.

The sound devices may be vibratile reeds electrically driven, buzzers, or any suitable mechanisms.

The herein described invention may be manufactured or used by the Government of the United States of America for governmental purposes without the payment of any royalties thereon or therefor.

I claim:

1. In a speed indicating device, a dial mounted and connected to be rotated proportionately to the speed of the vehicle on which the device is mounted, a solenoid mounted on said dial to rotate therewith, a core in said solenoid adapted to be projected when said solenoid is energized, resilient means to hold said core normally retracted, a series of contact elements disposed to be contactible by said core when the core is projected, the position of each of said elements corresponding to a certain speed, a signal device connected to each of said elements, each of the said signals being different from the others, and means to close electric circuits through said solenoid and said core and signals.

2. In a speed indicating device, a speedometer dial, a solenoid mounted thereon to rotate therewith, an insulating casing in which said solenoid is contained, a core slidably mounted in said solenoid, a contractile spring within said casing connected to said casing and said core, a series of contact elements disposed to be contactible by said core when said core is projected by the energization of said solenoid, each of said elements being positioned to correspond to a particular speed indication of said dial, a signal device connected to each of the said elements, each of the said signals being different from the others, and means to close electric circuits through said solenoid and said core and signals.

3. In a speed indicating device, a speedometer dial, a solenoid mounted thereon, a core slidably mounted in said solenoid, a contractile spring connected to said core to hold said core normally retracted, an arcuately disposed series of contact elements disposed to be contactible by said core when projected, the position of each of said elements corresponding to a particular speed indication of said dial, a signal device connected to each of said elements, each of the said signals being different from the others, and means to close electric circuits through said solenoid and said core and signals.

4. In a speed indicating device, a dial mounted and connected to be rotated proportionately to the speed of the vehicle on which the device is mounted, a solenoid mounted on said dial to rotate therewith, a core in said solenoid adapted to be projected when said solenoid is energized, resilient means to hold said core normally retracted, a series of contact elements disposed to be contactible by said core when the core is projected, the position of each of said elements corresponding to a certain speed, a signalling device connected to each of said elements, each of the said signalling devices giving out an individual and characteristic signal and means to close electric circuits through said solenoid and said core and signal devices.

5. In a speed indicating device, a rotatably mounted speedometer dial, a solenoid mounted thereon to rotate therewith, an insulating casing in which said solenoid is contained, a core slidably mounted in said solenoid, a contractible spring within said casing and said core, a series of contact elements disposed to be contactible by said core when said core is projected by the energization of said solenoid, each of said elements being positioned to correspond to a particular speed indication of said dial, a signalling device connected to each of the said elements, each of the said signalling devices giving a characteristic and individual signal, and means to close electric circuits through said solenoid and said core and signal devices.

6. In a speed indicating device, a rotatably mounted speedometer dial, a solenoid mounted thereon, a core slidably mounted in said solenoid, a contractible spring connected to said core to hold said core normally retracted, an arcuately disposed series of contact elements disposed to be contactible by said core when projected, the position of each of said elements corresponding to a particular speed indication of said dial, a signalling device connecting each of said elements, each of the said signalling devices giving characteristic and individual signal, and means to close electric circuits through said solenoid and means to close said core and signal device.

7. In an audible speed indicating device, a dial mounted and connected to be rotated proportionately to the speed of the vehicle on which the device is mounted, a solenoid mounted on said dial to rotate therewith, a core in said solenoid adapted to be projected when said solenoid is energized, resilient means to hold said core normally retracted, a series of contact elements disposed to be contactible by said core when the core is projected, the position of each of said elements corresponding to a certain speed and speed indicating means operatively connected to said contact elements.

8. In an audible speed indicating device, a rotatably mounted speedometer dial, a solenoid mounted thereon, a core slidably mounted in said solenoid, a contractile spring connected to said core to hold said core normally retracted, an arcuately disposed series of contact elements concentric with said dial disposed to be contactible by said core when projected, the position of each of said elements corresponding to a particular speed indication of said dial and speed indicating means characteristic of the speed represented by each said element electrically connected in a circuit with the respective elements to be operated by current therethrough.

9. In a speed indicating device, a rotatably mounted speedometer dial, a solenoid mounted thereon to rotate therewith, an insulating casing in which said solenoid is contained, a core slidably mounted in said solenoid, a contractile spring within said casing and said core, a series of contact elements disposed to be contactible by said core when said core is projected by the energization of said solenoid, each of said elements being positioned to correspond to a particular speed indication of said dial and speed indicating means characteristic of the speed represented by each said element electrically operatively connected in a circuit with the respective elements to be actuated therethrough.

DAVID E. CUMMINS.